Figure 1:
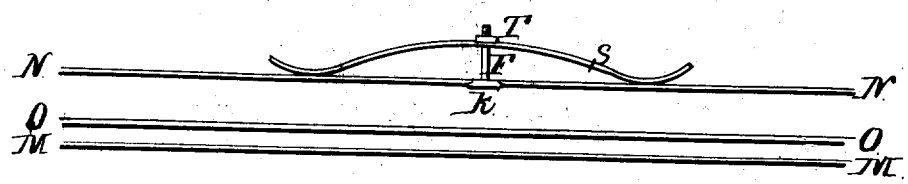
Figure 2:
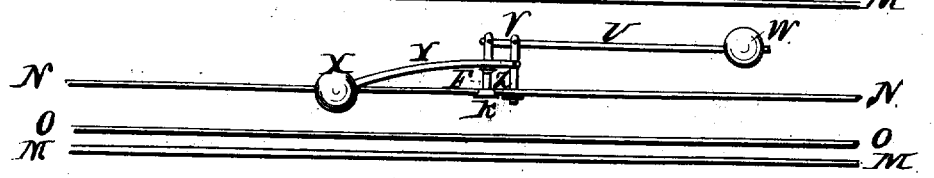

T. S. Easton,

Steam Safety Valve,

No. 46, Reissued Oct. 7, 1842.

N. PETERS, PHOTO-LITHOGRAPHER, WASHINGTON, D. C.

UNITED STATES PATENT OFFICE.

THOMAS S. EASTON, OF MOBILE, ALABAMA.

IMPROVEMENT IN THE MODE OF PREVENTING THE EXPLOSION OF STEAM-BOILERS.

Specification forming part of Letters Patent No. 2,454, dated February 12, 1842; Additional Improvement dated May 17, 1842; Reissue No. 46, dated October 7, 1842.

*To all whom it may concern:*

Be it known that I, THOMAS S. EASTON, of the city of Mobile, State of Alabama, have invented a new and Improved Mode of Preventing Steam-Boilers from Bursting or their Flues from Collapsing; and I do hereby declare that the following is a full and exact description.

The nature of my invention consists in placing a valve in the top of the flue, as at K, and of a size in proportion to the size of the boiler. The valve is ground into the seat from below, and when raised to its place is perfectly tight. Attached to the valve (which is of the same metal as the flue) is a stem, F, of the same metal. When the valve is placed in its seat, it is supported by a brace, D, of a form ordinarily used to secure the man-heads of boilers of from twelve to fifteen inches in span and from six to eight inches in height. The feet of the brace rest on fusible-metal plates placed on the top of the flue on each side of the valve and lengthwise the flue. Through the top of the brace is a square hole to receive the valve-stem, which is also square up to the thread of the screw, which is cut on the end, and which reaches above the brace, and is received by a nut, which, when screwed up, forces the valve to its place, the feet of the brace resting on fusible-metal plates (as before mentioned) encircled by simply a band of hard metal, E, resting on the top of the flue, the plates to be made of a fusible metal or composition of metals that melts at any degree of heat required, the band allowing the melted metal to run off between it and the flue, the feet of the brace D filling the band E so exact as to force the metal downward, so that what remains when the heat is reduced below the melting-point of the metal and the valve screwed up is ready for another operation. The nut which is attached to the valve-stem F on the top of the brace D is made with a bow or arch running up from two of its sides, and forming an arch over the valve-stem. This arch is embraced by a socket on the end of what I call the "driving-rod," which pierces the boiler perpendicular to the valve-seat in the flue, the hole in the shell being made steam-tight by the stuffing-box G, and furnished on the upper end with wrench H. With this driving-rod the engineer can raise the valve at will, so that when any portion of the metal has been melted and run off and the remainder cooled below the melting-point the valve can be screwed up and the work of the boiler proceed. The driving-rod is intended to obviate the necessity of cooling off the boiler, (so that the safety-valve could be got at from the inside to be replaced after the explosion of the valve,) and thereby save time. The safety-valve will work equally well with or without the rod as to safety. The only difference is delay without it. When the valve is intended to work with the driving-rod, the valve-stem must be square and the hole in the brace correspond to keep the valve from turning with the rod when in the act of screwing up; also a rivet with a long head on each side the band containing the metal, to keep them in their place when screwing up; but if the safety-valve is used without the rod they are of no use, as the engineer who screws up the valve will be able to keep them in their place when screwing, and after they are screwed up nothing can disturb them.

What I claim as my invention is—

The flue safety-valve acted on by fusible metal, which lets it down at any required degree of heat or steam-pressure, alike protecting the steam-boiler from bursting or its flue from collapsing; and I also claim the driving-rod, for which invention I desire to secure my right by Letters Patent, the flue safety-valve and driving-rod being in conjunction.

Washington city, 1842.

THOS. S. EASTON.

Witnesses:

JAMES DAVIS,

ALEXANDER CONNISON.